Aug. 1, 1967  R. J. SARGENT  3,333,814
WEDGE GATE VALVE ASSEMBLY
Filed Nov. 17, 1964  2 Sheets-Sheet 1

INVENTOR
RONALD J. SARGENT
BY *Olsen and Stephenson*
ATTORNEYS

INVENTOR
RONALD J. SARGENT
BY Olsen and Stephenson
ATTORNEYS

United States Patent Office 3,333,814
Patented Aug. 1, 1967

3,333,814
WEDGE GATE VALVE ASSEMBLY
Ronald J. Sargent, Ann Arbor, Mich., assignor to Thetford Engineering Corporation, Ann Arbor, Mich., a corporation of Michigan
Filed Nov. 17, 1964, Ser. No. 411,759
9 Claims. (Cl. 251—203)

ABSTRACT OF THE DISCLOSURE

A slide action gate valve having a C-shaped sealing ring on the upstream side of the valve gate having its lower lip positioned relative to the valve gate so that a cleaning and flexing action of the sealing ring occurs during closing of the valve. The valve gate and associated valve housing are also shaped to cooperate during closing of the valve gate to prevent accumulation or compacting of materials at the sealing ring.

---

The present invention relates to improvements in a slide action gate valve and to such a valve which is adapted primarily, but not exclusively, for use in sewage or septic waste systems.

In systems of this type, numerous problems have arisen in connection with prior art valves that have been used, including undesired leaking and sticking of the valves or the need to use excessive forces to open and close the valves. These conditions have occurred because of the corrosive effect of the sewage, the inability of the valve to be self-cleaning when opening and closing the same and the tendency of sealing means that have been used heretofore to lose thin resilient properties after a short time of usage.

It is an object of the present invention to provide an improved slide action gate valve which is constructed and arranged to provide a relatively smoother slide action of the valve gate for its entire stroke than was possible with conventional gate valves heretofore used.

It is another object of the present invention to provide an improved slide action gate valve which is constructed and arranged so that a self-cleaning action occurs during closing of the valve gate.

It is still another object of the present invention to provide an improved slide action gate valve of the foregoing character which has an improved sealing means which provides both a more effective seal and a seal of longer duration.

It is still another object of the present invention to provide an improved slide action gate valve which is characterized by its compact size, by its relatively low cost and its physical properties that assure its long and successful life.

Other objects of this invention will appear in the following description and appended claims, reference being had to accompanying drawings forming a part of this specification wherein like reference characters designate corresponding parts in the several views.

Figure 1:
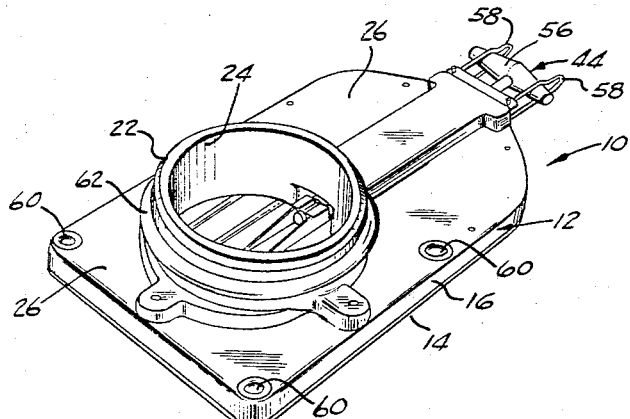
FIGURE 1 is a perspective view of a slide action gate valve in an inverted position, embodying one form of the invention.

Other objects of the invention will appear in the following description and appended claims. Before explaining the present invention in detail, it is to be understood that the invention is capable of other embodiments and of being practiced or carried out in various ways. It is also to be understood that the phraseology or terminology employed herein is for the purpossse of description and not of limitation.

Referring now to the drawings, the invention will be described in greater detail. The slide action gate valve 10 has a valve body 12 which is formed from valve body portions 14 and 16. The first or valve body portion 14 is shown as a sheet metal stamping formed from metal, such as stainless steel, which is generally flat and has an opening 18 formed therein. This opening is defined by an annular channel 20 which opens in the direction of the second or valve body portion 16, as can be seen in FIGURES 2 and 3.

The second or valve body portion 16 is preferably formed from a suitable plastic material by an injection molding operation. The second portion 16 includes a sleeve or annular flange 22 which defines the opening 24 which is concentric with the opening 18 in the first portion 14 and these openings 18 and 24 provide an outlet for the system in which the gate valve 10 is installed. Projecting laterally from the upper end of the annular flange 22, as viewed in FIGURE 2, is a generally flat flange 26 to which the first portion 14 is secured by suitable means, such as the screws 28. Clamped between the first and second portions 14 and 16 is a conventional seal 30 which functions to provide a liquid and gas tight joint around the peripheries of portions 14 and 16.

The second portion 16 has a stepped inner surface providing longitudinally thereof recesses 32 and 34 for receiving a valve gate 36, to be described. Thus, the valve gate 36 can be confined in a relative small space between valve body portions 14 and 16.

Figure 2:
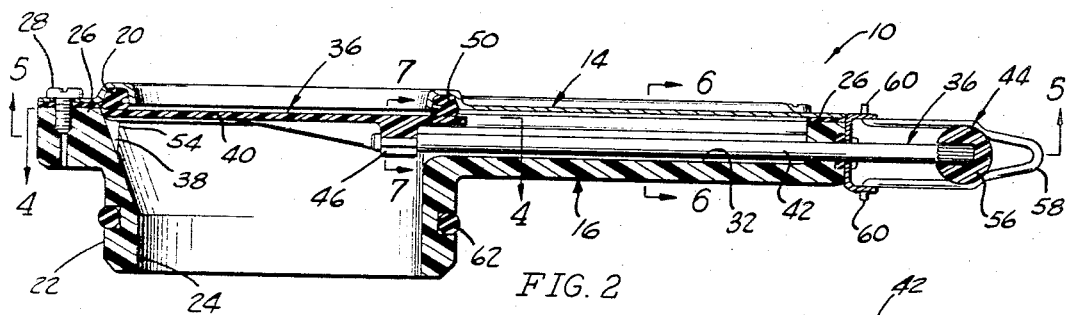
FIGURE 2 is an enlarged vertical section taken on the line 2—2 of FIGURE 5, showing the gate valve in a closed position.
Figure 3:
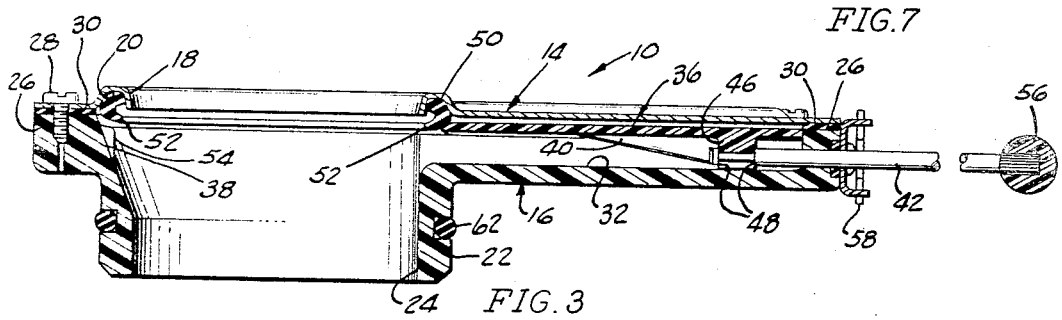
FIGURE 3 is a fragmentary section similar to FIGURE 2, showing the gate valve in an open position.
Figure 6:
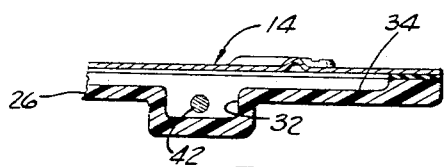
FIGURE 6 is a fragmentary section taken on the line 6—6 of FIGURE 2.
Figure 4:
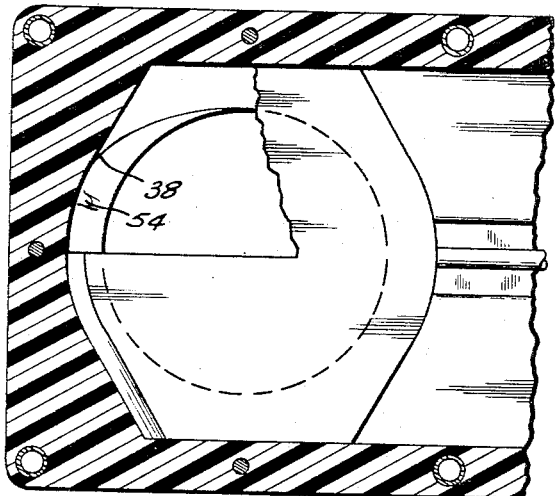
FIGURE 4 is a fragmentary section taken on the line 4—4 of FIGURE 2.
Figure 5:
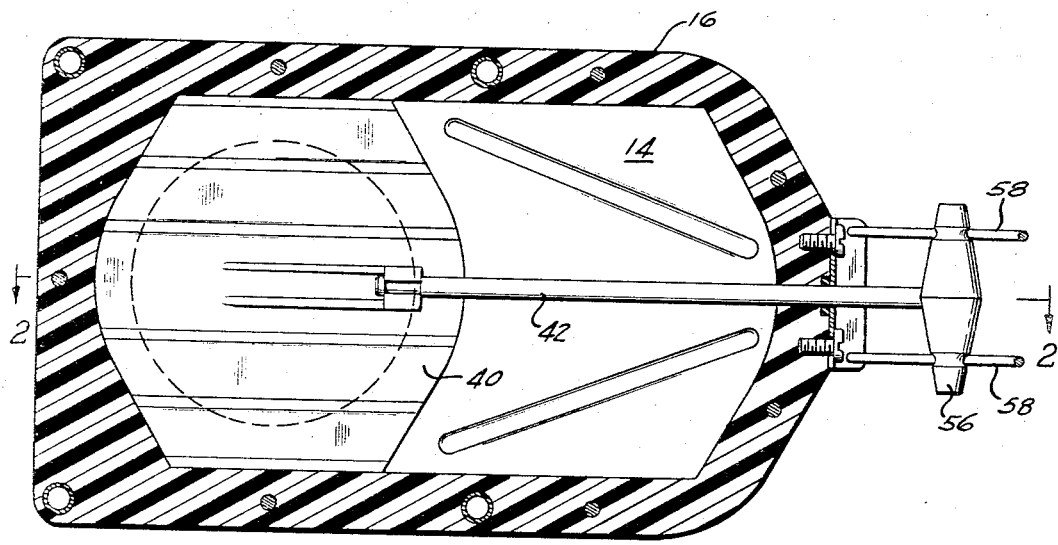
FIGURE 5 is a section taken on the line 5—5 of FIGURE 2.

As shown in FIGURES 2, 3 and 4, the annular flange 22 is also recessed at 38 in the inner wall thereof adjacent to the first body portion 14, as will be explained in greater detail, the recess 38 cooperates with valve gate 36 to provide a self-cleaning means for slide valve 10 when the valve gate 36 is moved to a closed position.

Mounted in the valve body 12 for sliding movement betwene the closed and open positions shown in FIGURES 2 and 3 is the valve gate 36 which includes the blade portion 40, the rod portion 42 and a mechanism 44 for moving or securing in position the valve gate 36.

Figure 7:
FIGURE 7 is a fragmentary section taken on the line 7—7 of FIGURE 2.

The blade portion 40 has a flat planar surface on its side facing the valve body portion 14 and on its opposite side are a pair of spaced prongs 46 between which the rod 42 can be inserted by a snap-action to be retained therein. As seen in FIGURE 7, these prongs will prevent lateral displacement of the rod 44, and the latter will be retained against axial displacement by the enlarged diameter of the rod 42 on opposite ends of the prongs 46, as is shown at 48, FIGURE 3. When reciprocated, the prongs travel in the recess 32 formed in the body portion 16.

Mounted in the annular channel 20 of valve body portion 14, for cooperation with the flat planar surface of blade portion in providing a sealed closure, is the resilient flexible sealing ring 50. The latter has a C-shaped cross section which in the unstressed condition shown in FIGURE 3 has the opening in the C pointing radially inwardly and axially toward the second valve body portion 16, and the lower lip 52 thereof is dimensioned so that it projects into the path of movement of the blade portion 40. Thus, when the blade portion 40 is moved from its FIGURE 3 position to its FIGURE 2 position the lower lip 52 will be urged upwardly partially closing the groove in the C-shaped cross section, as seen in FIGURE 2.

This construction and arrangement of the seal ring 50 and the cooperation that occurs with the flat planar surface of the blade portion 40 is one of the significant features of the present invention. By virtue of the construction and arrangement disclosed, a substantial flexing of the sealing ring occurs with each opening and closing of the valve gate. This flexing assures that a good seal is always present and protects against the seal ring merely becoming stiff and, in effect, non-resilient such as occurs frequently with seal rings of the O-ring type when used in conventional prior art types of gate valves.

It is also to be observed that the blade portion 40 has its forward edge beveled on its opposite faces so as to provide a knife-like edge. This doubled beveled edge serves several useful purposes. Initially, the beveled edge adjacent to the flat planar surface aids in urging the lip 52 to the upwardly urged position shown in FIGURE 2. The beveled edge adjacent to the opposite surface aids in enabling the blade portion 40 to slide upon the shoulder projections 54 that are integral with the wall of the annular flange 22. By virtue of this feature the blade portion 40 will always be properly aligned in a sealing positon with respect to the seal ring 50.

The double beveled forward edge of the blade portion also provides a knife-like edge for cutting any sewage or sediment that may have accumulated under the seal ring 50 so as to keep this region clear and thereby assure free movement of the seal ring 50. Still further, the lower beveled edge cooperates with the recessed portion 30 in annular flange 22 in pushing downwardly any sewage that otherwise would gather under the forward side of the blade portion 40 and seal ring 50. Thus, the gate valve is self-cleaning when it is being closed.

Another feature of the present invention which is realized by virtue of the seal ring 50 and blade portion 40 construction is the smooth slide action that occurs with a relatively light push or pull. The present design has been found to require only six to twelve pounds of pull as compared to the twenty-two to thirty-five pounds' pull required with conventional prior art units of the same size.

In this respect it has been found desirable to manufacture the seal ring 50 from rubber and then to coat the lower surfaces of the seal ring with Teflon. Also, it is found desirable to manufacture the blade portion in a molding operation using Fulton 404, a thermoplastic compound consisting of TL–126 dispersed uniformly in an acetal resin. TL–126 is a very fine TFE lubricant processed by Liquid Nitrogen Processing Corporation of Malvern, Pa.

The mechanism 44 for opening and closing the valve gate 36 is adapted to be manually operated. However, it is to be understood that the present invention has application in a variety of sewage or other systems wherein linkages of varying design may function to move the valve gate. In the illustrated embodiment, a handle 56 is used to pull and push the rod 42 and thereby the blade portion 40. Spring clips 58 are employed to lock the handle in a closed position, such as is shown in FIGURE 1. When it is desired to release the spring clips 58, they are pivoted outwardly around their inner pivots, FIGURE 2, to the positions shown in FIGURE 3.

It is also to be understood that the present invention can be used in a variety of systems wherein various adapters can be mounted against the valve body portions 14 by means of the holes 60, FIGURE 1. Also, various types of collectors or fittings may be fitted externally on the annular flange 22 in sealing relationship by virtue of the O-ring 62.

From the foregoing description it can be understood that a small compact slide valve assembly has been provided which carries out the objects set forth herein.

Having thus described my invention, I claim:

1. A slide action gate valve for use in a sewage or septic waste system comprising a valve body having first and second portions defining an outlet, a valve gate slidably supported in said second portion for movement in a path perpendicular to the axis of said outlet for closing said outlet, said valve gate having a blade portion with a flat planar surface facing said first portion, a resilient flexible seal ring supported in said first portion adjacent to the periphery of said outlet and in sealing engagement with said flat planar surface when said valve gate is in its closed position, said seal ring having a C-shaped cross section which opens radially inwardly and downwardly toward said second portion, the inner surface of the lower lip of said seal ring being inclined downwardly to the lip terminus and extending into the path of movement of said blade portion and adapted to be urged upwardly by the advancing edge of said blade portion to a position in sealing engagement with said flat planar surface.

2. A slide action gate valve for use in a sewage or septic waste system comprising a valve body having first and second portions with concentric openings defining an outlet, a valve gate slidably supported in said second portion for movement in a path perpendicular to the axis of said outlet for closing said outlet, said valve gate having a blade portion and having a knife-like forward edge with a planar surface facing said first portion, a resilient flexible seal ring supported in said first portion adjacent to the periphery of said outlet and in sealing engagement with said flat planar surface when said valve gate is in its closed position, said second portion having an annular flange defining its concentric opening, said flange having a recess in its inner wall adjacent to said seal ring into which the forward edge of said blade portion projects into abutting engagement with said inner wall when said valve gate is closed, the recessed inner wall converging radially inwardly in a direction axially away from said first portion and at an angle so that the inner wall is inclined from the line of said abutting engagement of said blade portion when the latter is in a closed position.

3. A slide action gate valve as claimed in claim 2 wherein said flange has in said recess at least one shoulder formation facing said seal ring on which the forward end of said blade portion is seated when said valve gate is closed so that said flat planar surface is urged against said seal ring.

4. A slide action gate valve as claimed in claim 3 wherein the forward end of said blade portion is beveled on both surfaces of the blade to define said knife-like forward edge.

5. A slide action gate valve comprising a valve body having first and second portions with concentric openings defining an outlet, a valve gate slidably supported in said second portion for closing said outlet, said valve gate having a blade portion with a planar surface facing said first portion and having a knife-like forward edge, a resilient flexible seal ring supported in said first portion adjacent to the periphery of said outlet and in sealing engagement with said flat planar surface when said valve gate is closed, said seal ring having a C-shaped cross section which opens radially inwardly and downwardly toward said second portion, the inner surface of lower lip of said seal ring being inclined downwardly to the lip terminus and extending into the path of movement of said blade portion, said second portion having an annular flange defining its concentric opening, said flange having a recess in its inner wall adjacent to said seal ring into which the forward edge of said blade portion projects into abutting engagement with said inner wall when said valve gate is closed, the recessed inner wall converging radially inwardly and axially away from said first portion and at an angle so that the inner wall is inclined from the line of said abutting engagement of said blade portion when the latter is in a closed position.

6. A slide action gate valve comprising a valve body having first and second connected portions with concentric openings defining an outlet, said second portion having an annular flange defining its concentric opening and a generally flat flange projecting laterally from the end of the annular flange, said first portion being generally flat and overlying the generally flat flange of said second portion and having an annular channel facing said second portion and defining the concentric opening of the first portion, a resilient flexible seal ring supported in said annular channel, said seal ring having a C-shaped cross section which opens inwardly and downwardly toward said second portion, the inner surface of the lower lip of said seal ring being inclined downwardly to the terminus and said lip projecting out of said annular channel, a valve gate having a blade portion slidably supported between said first portion and the generally flat flange of said second portion and reciprocally movable normal to the axis of said outlet between an open position at one side of said outlet to a closed position extending transversely of the outlet, said blade portion having a flat planar surface facing said first portion and in engagement with said lower lip urging the latter toward said annular channel when the blade portion is in its closed position.

7. A slide action gate valve as claimed in claim 6 wherein said valve gate includes a rod slidably mounted in said valve body and projecting externally therefrom, said rod being connected to said blade portion by a snap-on connection.

8. A slide action gate valve as claimed in claim 6 wherein said seal ring is rubber coated with Teflon.

9. A slide action gate valve as claimed in claim 6 wherein said blade portion is formed of a thermoplastic compound.

References Cited

UNITED STATES PATENTS

| | | | |
|---|---|---|---|
| 2,631,759 | 3/1953 | Hoopes | 137—240 X |
| 2,893,684 | 7/1959 | Williams | 251—203 X |
| 2,907,342 | 10/1959 | Berg | 251—176 X |
| 2,925,992 | 2/1960 | Richard | 251—172 |
| 3,185,436 | 5/1965 | Rovang | 251—172 |
| 3,212,753 | 10/1965 | Milette | 251—203 |
| 3,258,244 | 6/1966 | Hilton | 251—203 |

FOREIGN PATENTS 675,565 12/1963 Canada.

CLARENCE R. GORDON, *Primary Examiner.*

UNITED STATES PATENT OFFICE
CERTIFICATE OF CORRECTION

Patent No. 3,333,814                               August 1, 1967

Ronald J. Sargent

It is hereby certified that error appears in the above numbered patent requiring correction and that the said Letters Patent should read as corrected below.

Column 4, line 61, before "lower" insert -- the --; column 5, line 12, before "terminus" insert -- lip --; line 13, before "out" insert -- downwardly --.

Signed and sealed this 18th day of June 1968.

(SEAL)
Attest:

Edward M. Fletcher, Jr.                       EDWARD J. BRENNER
Attesting Officer                              Commissioner of Patents